May 16, 1967   C. A. SCHAEFER   3,319,571
LIQUID LEVEL RESPONSIVE APPARATUS
Filed Oct. 27, 1964   4 Sheets-Sheet 1

INVENTOR.
Carl A. Schaefer,
BY
John W. Leonard,
his ATTORNEY.

INVENTOR.
Carl A. Schaefer,
BY John O. Lenard
his ATTORNEY.

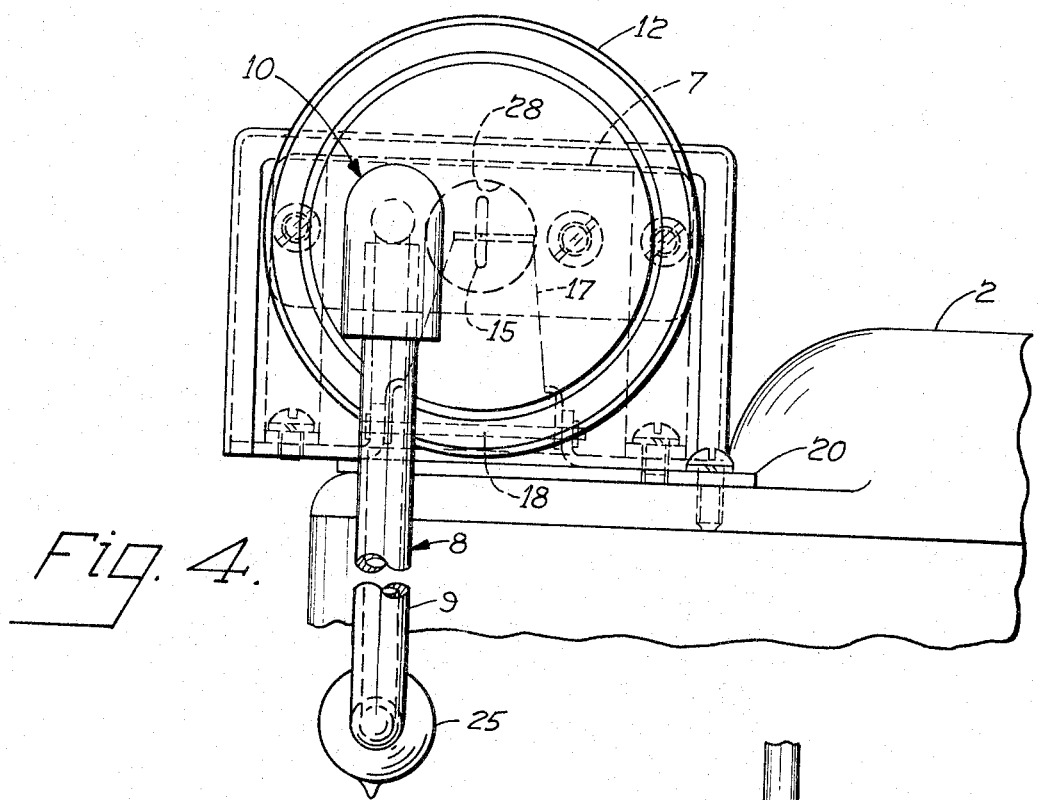
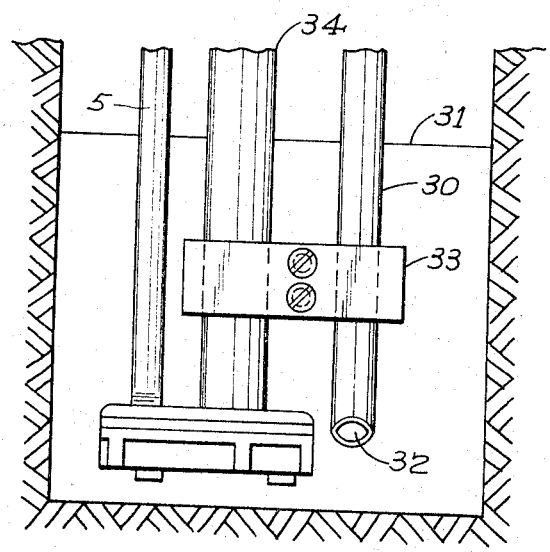
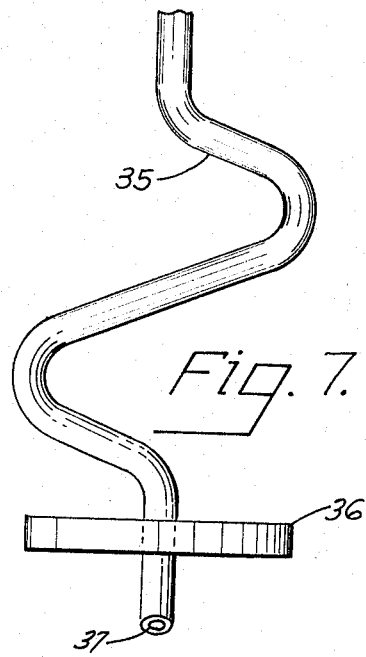

INVENTOR
Carl A. Schaefer,
BY John H. Leonard,
his ATTORNEY.

United States Patent Office 3,319,571
Patented May 16, 1967

3,319,571
LIQUID LEVEL RESPONSIVE APPARATUS
Carl A. Schaefer, Asheville, N.C., assignor to Square D
Company, Park Ridge, Ill., a corporation of Michigan
Filed Oct. 27, 1964, Ser. No. 406,723
12 Claims. (Cl. 103—25)

This invention relates to a liquid level operated apparatus employing a hydraulic transducer which is responsive to variations in the level of liquid in a container and particularly to a control apparatus employing such a transducer for supplying a signal when the level of the liquid in the container reaches a predetermined level.

It is an object of the present invention to provide a hydraulic transducer which is extremely simple in structure; which is adapted for responding to liquid levels between relatively wide or narrow limits, as desired; which has few moving parts, of which the working parts to be subjected in use to the liquids in the container are free from relatively movable joints or connections which would be apt to be contaminated or corroded by the liquids within the container and thereby cause the transducer to function erratically; in which the operation of a reservoir at the lower end of the transducer is not affected by changes in the depth of submersion, even during the cycling or operation of the transducer, without affecting the operation so long as the reservoir is maintained below the level of the liquid in the container; and wherein the operation of the tranducer is not changed by misalignment or migrations of the reservoir of the transducer with respect to other parts of the transducer and wherein puncturing or destruction of the reservoir of the transducer will not affect the operation, providing the end of the tube connecting the reservoir to the remaining parts of the transducer remains open and below the surface of the liquid in the container, and of which the operation is not affected by variations in atmospheric pressure.

Other objects and advantages will become apparent from the following description, wherein reference is made to the drawings, in which:

FIG. 4 is a right-hand elevation of the structure illustrated in FIG. 3, part of the motor being shown for clearness of illustration;

FIG. 6 is a fragmentary front elevation, similar to FIG. 3, of a modified form of the device;

FIG. 7 is a fragmentary front elevation of another modified form of the device.

Figure 1:
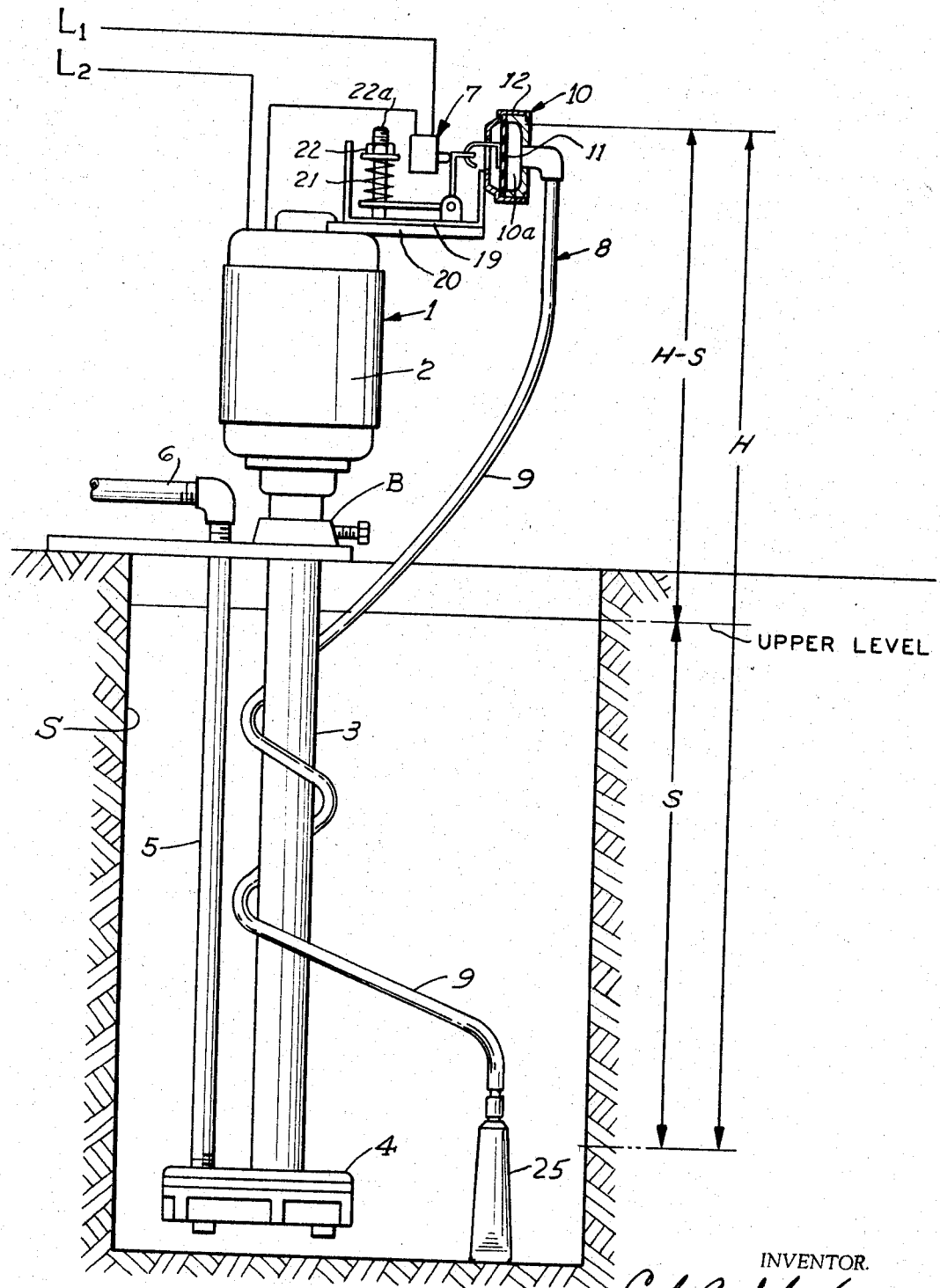
FIG. 1 is a diagrammatic front elevation of a preferred form of a control device embodying the principles of the present invention, showing the same in operative position in a container.
Figure 2:
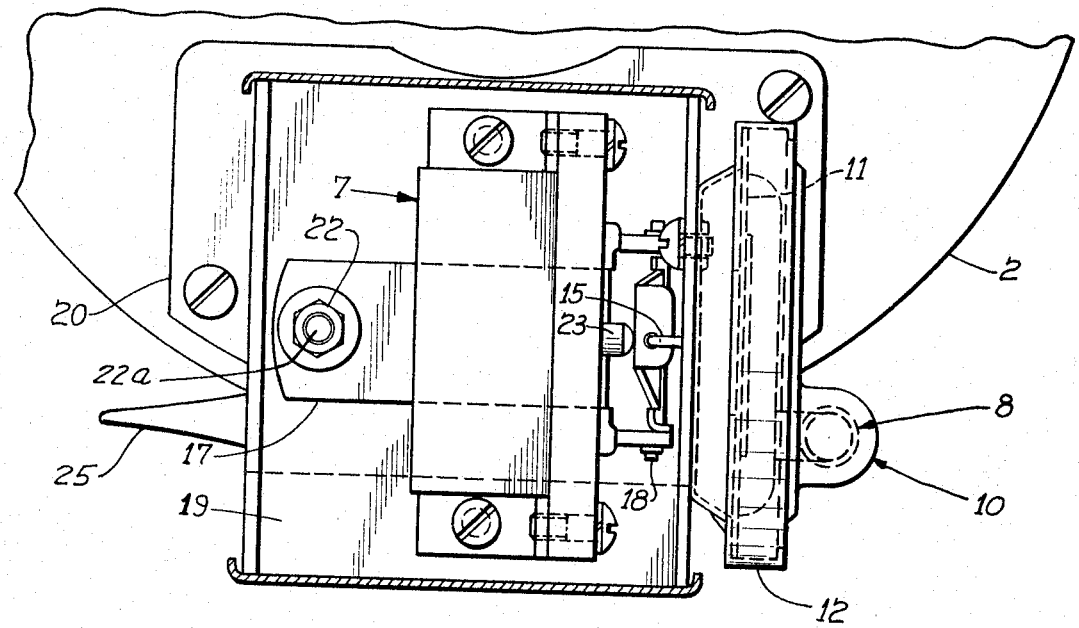
FIG. 2 is a top plan view of a control device and a fragment of the structure illustrated in FIG. 1, showing the relation therebetween.

Referring first to FIG. 1, the force transducer is shown for purposes of illustration as arranged to respond to the surface level of water in a receptacle or a sump S for operating an electric switch which, in turn, controls a sump pump motor, its use for other purposes, such as for operating liquid level indicators, linear variable differential transformers, or signals and the like, and with other liquids in other containers being readily apparent from the illustrative example.

The sump pump and motor combination may be one of the conventional type supported in an operating position relative to the sump S by a suitable supporting bracket B. For example, an electric motor 1 may be mounted on the bracket B with its shaft vertical. The motor 1 has a casing 2 which supports a depending upright tube 3 of which the lower end is connected to a casing of a pump 4. The pump 4 is driven by a vertical shaft, not shown, driven by the motor 1. A tube 5 leads from the pump outlet to a level above the sump and discharges through a conduit 6. When the motor is operated, the water in the sump is drawn into the casing of the pump 4 and forced upwardly through the tube 5 by the pump 4 and out through the discharge conduit 6 which leads to a suitable drain or evaporation pit.

The structure thus far described is conventional and readily obtainable on the market.

In order to start and stop the motor 1 a suitable electric switch 7 is provided. The switch preferably may be of the snap-action, self-restoring type, such as disclosed in U.S. Letters Patent No. 3,017,471, issued January 16, 1962, Walter C. Karch, inventor. For controlling the switch a hydraulic transducer 8 of the present invention is employed.

The hydraulic transducer 8 comprises an elongated body having a passage extending therethrough endwise of the body. In the illustrative example, the body is shown as a flexible tube 9 with a hollow housing 10 connected to one end. The housing 10 has a cavity 10a therein with an opening at one side which is in communication with the passage in the tube 9 so that the passage in the tube 9 and the cavity in the housing 10 form a continuous sealed elongated passage.

The tube 9 preferably is flexible but it may be rigid and formed straight or curved. While the tube 9 may be a stiff metal pipe, preferably tube 9 is flexible and along with the housing 10 is formed of a plastic material, such as polyethelene plastic material which is inert to most corrosive liquids.

Expansible or contractible sealing means are provided for sealing the upper end of the transmitter passage. In the illustrative example, these means are a flexible diaphragm 11 which is also formed of a material which is inert to corrosive forces. The diaphragm 11 is secured at its peripheral margin in sealed relation with the end wall of the housing 10 surrounding the open end of the cavity 10a by a metal clamping retainer 12 which is secured to the housing 10 by bending a portion of the retainer over the housing 10.

However, if desired, the sealing means may be a metal bellows, a Bourdon tube, or other conventional form of sealing device having an expansible chamber in communication with the passage in the tube 9.

The portion of the diaphragm 11 within the clamped margin preferably offers no appreciable resistance to movement in directions for causing expansion and contraction of the chamber defined by the diaphragm 11 and the cavity in the housing 10.

The contral portion of the diaphragm 11 is clamped between two discs 13 and 14. The disc 13 carries a hook or other connecting means 15 which is connected to a lever 17. The lever 17 is preferably a bell crank and is pivotally supported by a pivot 18 on a rigid base 19. The base 19 supports the retainer 12 which, in turn, supports the housing 10 as well as the mechanism operated by the transducer 8, and, in turn, is mounted on a support 20. The support may be bolted, as illustrated, to the casing 2 of the motor 1.

Figure 3:
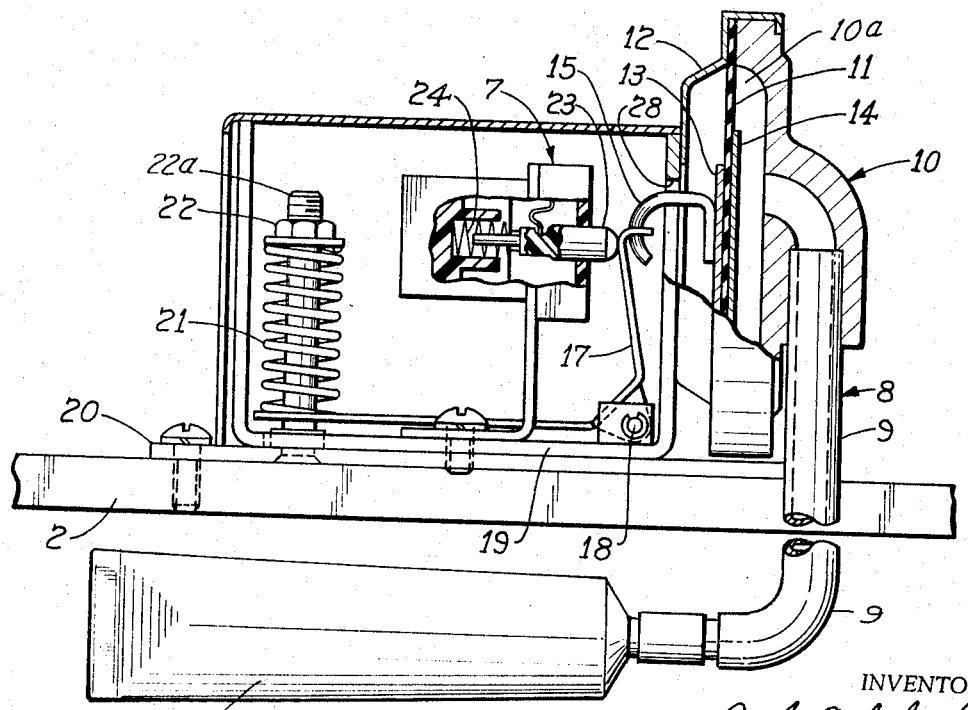
FIG. 3 is a front elevation, partly in section, of the control device illustrated in FIG. 2.

A biasing spring 21 has one end resting on the lever 17 to bias the diaphragm 11 to its extended position, which is to the left in FIG. 3. The force supplied by the spring 21 may be adjusted by means of an adjusting nut 22 which is threaded onto a stud 22a. The stud 22a extends through the spring 21 and is rigidly connected to the base 19. The switch 7 likewise may be carried on the base 19 and preferably is spring biased to the Off position. The switch has an operating button 23 which is moved to the right of FIG. 3 by a self-restoring biasing spring 24 of the switch when the switch moves to the Off position.

When the lever 17 is rocked counterclockwise in FIG. 3, by the spring 21, it presses the button 23 until the botton causes the switch 7 to move to an On position and start the motor 1. When the lever 17 is rocked clockwise against the force of the spring 21 by the diaphragm 11, it permits the switch button 23 to move to the right so that the spring 24 restores the switch 7 to Off position, thereby stopping the motor. The operating button 23 is thus biased by the spring 24 against the lever 17 at the opposite side of the pivot 18 from the spring 21 and in opposition to the spring 21 so that the turning moments imposed by the spring 24 and by the spring 21 are opposed to each other. Consequently, by adjusting the nut 22, the turning moment imposed by the spring 24 acting through the operating button 23 can be balanced, and exceeded, by the spring 21. However, if desired, the switch 7 may be positioned on the same side of the pivot 18 as the spring 21 so the operating button 23 will impose a moment of force in the same direction as the spring 21. In such case, the lowest moment which can be imposed in the direction for causing the switch 7 to operate cannot be less than that imposed by the spring 24. In the form illustrated in FIG. 1, the tube 9 is shown as provided at its lower end with an expansible and contractible sealing means which preferably is in the form of a flexible reservoir 25 having an internal cavity which forms a continuation of the body passage of the transducer 8.

In the preferred form of the invention, the reservoir 25 is formed as a bladder having flexible walls impervious to the passage of liquids and gases. Typical examples of structures which may be used to form the reservoir 25 include a rubber balloon, a polyethylene vial which has relatively thin walls so that it is extremely flexible and which has one end closed and sealed and the other end sealed to the flexible tube 9.

Figure 5:
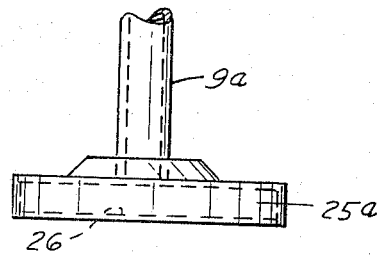
FIG. 5 is a fragmentary front elevation of the lower part of the apparatus in FIGS. 1 through 4 showing a modified type of sealing means.

As shown in FIG. 5, another form of reservoir which may be used includes a rigid metal housing 25a which has an internal cavity sealingly connected to a tube 9a, corresponding to the tube 9, and a flexible wall 26 which is sealingly attached to the housing 25a and is formed of a material having a thickness so that it offers no appreciable resistance to flexure.

In fact, as will be later explained, the transducer 8 will operate without the reservoir 25, as shown in FIGS. 6 and 7, although certain difficulties will be experienced because air or other compressible gases may enter the tube 9 when the reservoir is absent. Another feature of the transducer 8 to be noted is that the outside surface of diaphragm 11 is exposed to atmosphere through opening 28.

Before mounting the transducer 8 on the base 19, the entire system including the hollow housing 10, the reservoir 25 and the tube 9 connecting the housing 10 and reservoir 25 are filled with fluid. The liquid may be water or a non-freezing solution, preferably of the same specific gravity as the fluid within the container or sump S. Preferably all of the air and other compressible gases are excluded from the sealed system. This result may be accomplished by first boiling the liquid to be used as a fill or deaerating the same by applying a vacuum above the surface of the liquid to be used as a fill in a closed container. For an improved operation of the system a small amount of a suitable wetting agent may be added to the liquid to be used as a fill which will prevent trapping of bubbles of air along the inside surfaces of the system.

The system is then filled, but before sealing, sufficient liquid is expelled so that the diaphragm 11 and the reservoir 25 are both in a slack or mid-position. Thus a small volume of liquid can be caused to flow through the tube 9 from the reservoir 25 to the diaphragm 11 and vice versa, without stretching the walls of either so that a flow of liquid will occur with a minimum resistance. The system is then sealed with an air and fluid tight seal. While in this filled condition, the reservoir 25 and lower end of the tube 9 are submerged in the water in the sump S to a depth below the lowest level to which the surface of the water in the sump S is to be lowered by the pump 4.

The only limitation on the size and expandability of the reservoir 25 is that, when the transducer body 8 is filled as described, the reservoir 25 can move or expand sufficiently so that at least all of the liquid in the transducer 8 displaced by the diaphragm 11, when the diaphragm 11 is in fully contracted position, can be contained within the system between the diaphragm 11 and the distended or expanded reservoir 25. Thus the reservoir provides a means which is operatively associable with the water in the sump S, consequent upon submergence of the reservoir 25, for effecting free transmission of the effect of hydraulic head between the water level in the sump S and the liquid in the passage of the transducer 8.

Assuming that the device is installed in the operating position, as illustrated in FIG. 1, the operation is as follows:

The outer face of the diaphragm 11 is subjected to atmospheric pressure as also is the surface of the water in the sump S. Consequently, within limits under all conditions of operation of the transducer 8, both the diaphragm 11 and reservoir 25 are subjected to the same atmospheric pressure. Hence, as will be explained, changes in atmospheric pressure balance out and variations in the level of water in the sump S dictate the forces transmitted by the transducer 8.

Consider the transducer shown in FIG. 1 to be filled with water and the sump S to be empty of fluid so that the reservoir 25 is suspended vertically in the air. The distance in feet between diaphragm 11 and reservoir 25 is represented by H. The outer surfaces of both diaphrgam 11 and the reservoir 25 are acted upon by substantially the same atmospheric pressure "$a$." The pressure "$a$" on the outside of diaphragm 11 is directed downward. Pressure "$a$" on the outside surface of reservoir 25 is directed upward but its effect on diaphragm 11 is lessened by the head of water H inside the transducer. Since a one foot column of water exerts a downward pressure of 0.432 p.s.i., the pressure upward inside diaphragm 11, is then $(a-0.432H)$. Thus, the net pressure on diaphragm 11 is downward and is, therefore, the difference between the downward and upward pressures, or $a-(a-0.432H)=0.432H$ p.s.i. To operatively position the diaphragm intermediate its limits of movement, and thus to place the transducer in a state of equilibrium, will require an upward balancing force of 0.432HU, where U is the square inch effective area of diaphragm 11. This force is supplied by the spring biased lever 17.

With the transducer thus in equilibrium, the inside pressure at the reservoir 25 exceeds the inside pressure at the diaphragm 11 by the pressure of the water column *inside* the system, being in this case 0.432H p.s.i. Adding the pressure of the water column, 0.432H p.s.i., to the pressure inside the diaphragm 11 $(a-0.432H)$, it is seen that $(a-0.432H)+0.432H=a$. Thus, the pressure inside the reservoir 25 equals "$a$" and the inside pressure "$a$" and the outside pressure "$a$" on the reservoir 25 are equal and therefore the effective area of the reservoir 25 is without direct significance.

When the reservoir is submerged in water to a distance S, this being less than the distance or head H, the distance from the diaphragm 11 to the surface of the water is then $(H-S)$ feet. The pressure on the outside of the reservoir is equal to the atmospheric pressure plus the pressure of the external head S or: $a+0.432S$. Due to the yielding walls of the reservoir, this pressure is directed upward inside the system, but its effect inside diaphragm 11 is lessened by the pressure of the head H inside the system, becoming $a+0.432S-0.432H$, or $a-0.432(H-S)$ p.s.i. Since the downward pressure on the outside of diaphragm 11, neglecting for the moment the force of the spring 21, is "$a$" p.s.i., the net pressure on the diaphragm is downward and equals the difference of the two pressures. Stated in other terms, it is seen that:

$$a-[a-0.432(H-S)]=0.432(H-S)$$

Accordingly, the net pressure acting on diaphragm 11 is always proportional to the head of water inside the transducer from the diaphragm 11 to the surface of the water within the sump S. To maintain the transducer in equilibrium, a like balancing force is supplied by the spring 21 through the lever 17.

Since the pressure inside diaphragm 11 is a $a-0.432(H-S)$ p.s.i., and the reservoir 25 is H feet below this point, the pressure inside the reservoir is 0.432H p.s.i. or greater than that at diaphragm 11 and equals: $a-0.432(H-S)+0.432H$, or: $a+0.432S$ p.s.i. Now this is the same as the pressure on the outside of the reservoir, and the difference between the inner and outer pressures at the reservoir 25 is again 0. Since there is no strain on the reservoir 25, its walls may be very thin and flexible. Also since the net pressure on the walls of reservoir 25 is always 0, the reservoir 25 can drift upward and downward in the liquid while the system is operating, with no effect on its functioning.

Since the system depends upon atmospheric pressure to support the liquid head $H-S$, therefore this head must not be greater than the height of a column which exerts a pressure equal to atmospheric at the particular elevation where the equipment is installed (34 feet at sea level, for water), and for reliable operation the head should be somewhat less. However, a liquid of specific gravity less than that of water can be used inside the system to extend the distance $H-S$ somewhat, if desired.

One method of adjusting the system when it is initially installed as shown in FIG. 1, is to physically position the reservoir 25 in air at the maximum upper level to which the liquid in sump S is to rise. The pressure exerted by the spring 21 on the lever 17 is then varied by adjusting the nut 22 so the switch 7 is tripped to start the motor 1 for causing the pump 4 to lower the level of the liquid in the sump S. A method of adjusting of the tripping of switch 7 to start the motor 1 may be accomplished by initially loosening the nut 22 so the switch 7 is in a circuit opening condition. As the nut 22 is progressively tightened, the spring 21 is progressively compressed to apply an increasing pressure on lever 17 which causes the lever 17 to rotate counterclockwise, as viewed in FIGS. 1 and 3, and the diaphragm 11 to move to the left. The adjustment is completed when the lever 17 is rotated counterclockwise to the position wherein the switch actuator 15 is moved sufficiently to the left in FIG. 3 to the position which causes the snap acting mechanism of the switch 7 to respond and move the contacts of the switch 7 to a circuit closing position to start the motor 1.

When the system is in operation, the reservoir 25 is submerged in the liquid in the sump S. When the liquid level in the sump S rises to the upper level, because of the previous adjustment of the spring 21, the switch 7 will trip to start the motor 1. As the pump 4, which is driven by motor 1, causes the level of the liquid in the sump S to be lowered, the distance between the diaphragm 11 and the level of the liquid in the sump S increases to thereby increase the effective head of liquid in the transducer above the surface of the liquid in the sump S. This increased liquid head causes the reservoir 25 to receive additional liquid from the tube 9 and, consequently, the volume of liquid in the housing 10 is decreased, thereby permitting the diaphragm 11 to move to the right under the pressure of the atmosphere which acts on the outside thereof. The reservoir 25 has walls which freely expand sufficiently to accommodate the liquid thus displaced. The movement of the diaphragm 11 to the right also causes the lever 17 to rotate in clockwise direction. As the lever 17 thus rotates clockwise the spring 21 is progressively compressed and gradually exerts a progressively increasing pressure to oppose the clockwise movement of the lever 17.

The movement of the diaphragm to the right in FIG. 3, in this manner, rocks the lever 17 clockwise a sufficient distance so that the button 23 of the switch is permitted to move to the right and is so moved by the self-restoring spring 24 of the switch a distance such that the switch 7 automatically turns off and remains Off until the water in the sump S reaches the upper level and the cycle is repeated.

Preferably the switch 7 is of the snap acting type which has a slight differential travel of its operating button between circuit opening and closing positions. Decreasing the initial compressive force of the spring 21 reduces the distance $(H-S)$ that the level in the sump S must fall below diaphragm 11 to operate the switch 7. Increasing the initial compression increases the distance $(H-S)$ the level in the sump S must fall to operate the switch 7.

In this connection, it should be noted that the differential between the upper and lower operating levels of the liquid in the sump S is not dependent upon the adjustment of the nut 22. The adjustment of the nut 22 is used to vary the height between the diaphragm 11 and the operating levels of the liquid in the sump S. The differential between the upper and lower operating levels of the liquid within the sump is a function of the rate of the spring 21 and the operating characteristics of the switch 7 including the rate of spring 24, as well as the travel differential of the operating button 23 of the snap switch 7 as the switch 7 moves between its circuit opening and closing positions in response to the movement of the operating button 23.

As mentioned, the tube 9 may be rigid or flexible, and it is unimportant whether the reservoir 25 at the lower end of the tube is directly beneath the housing 10 or is offset laterally therefrom. Furthermore, the length of the tube 9 and the depth of immersion of the reservoir 25 are immaterial. Thus the device has great flexibility for meeting various conditions existing in the field.

The principal purpose served by the reservoir 25 to the practical application of the system is that the reservoir 25 provides a closed transducer which can be readily stored, shipped and installed. The reservoir 25 additionally prevents contamination of the liquid fill in the housing 10, the tube 9 and the reservoir 25 by gaseous, liquid and solid contaminants, any one of which may make the system either inoperative or inaccurate. In the form above described, the sealing means on the lower end of the body for causing a free transfer of hydraulic pressure head between the water in the sump S and the liquid in the transducer 8 is the reservoir 25. However, if this reservoir 25 is removed while the tube is still submerged, the means for this purpose becomes merely the submerged open lower end of the tube 9, as the transducer 8 will operate effectively with or without the reservoir 25. The transducer 8 will remain in filled condition and will operate as long as the open lower end of the tube 9 is submerged and the height $H-S$ does not exceed the weight of the column of liquid fill with atmospheric pressure will support. Another advantage in using the reservoir 25 at the lower end of tube 9 is that, should the pump switch 7 fail to open, thus causing lowering of the water in the sump S to expose the lower end of the transducer 8, air is prevented from entering the lower end of the tube 9 when the diaphragm 11 is restored to its neutral position. This obviates the necessity that the entire transmitter be removed, refilled, and reinstated in operating position.

An embodiment wherein the reservoir 25 is omitted is illustrated in FIG. 6, wherein a tube 30 corresponding to the tube 9 is connected to a similar upper housing. The system is completely filled, and the lower end of the tube is immersed in the sump below the liquid level 31. The lower end of the tube is open as indicated at 32. A suitable bracket 33 is connected above the sump pump to the tube 34, corresponding to the tube 3 heretofore described, and is connected to the tube 30, thus assuring that the lower end 32 remains below the lowest level of the liquid in the sump.

Referring next to FIG. 7, there is shown a flexible tube 35, which corresponds to the tube 9 heretofore described. The lower end of the tube 35 extends slightly below a float 36 and has an open end indicated as 37. As mentioned, the depth of submersion of the lower end of the tube is immaterial, so long as it remains below the surface level at any time. In the form illustrated in FIG. 7, the float rises and falls with the surface level of the sump liquid, but nevertheless, the hydraulic head within the transducer 8, acting on the diaphragm 11 of the upper housing 10 has the same effect as though the lower end of the tube remained in fixed submerged position in the sump.

Figure 8:
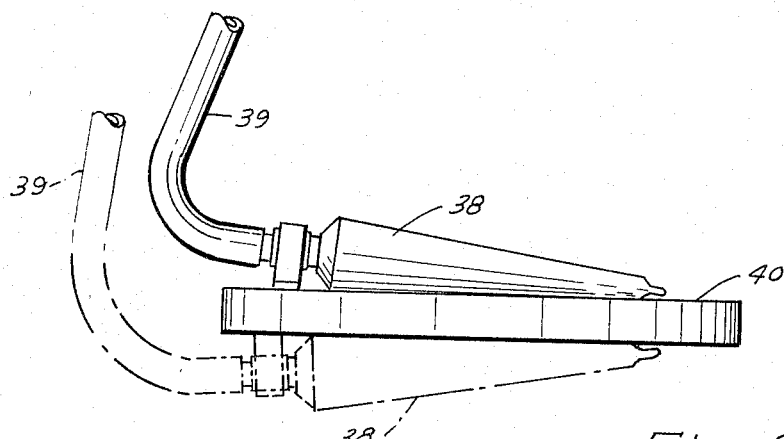
FIG. 8 is a fragmentary front elevation of the lower part of the apparatus of FIGS. 1 through 4 showing a modified manner of supporting the reservoir or sealing means.

As shown in FIG. 8, a reservoir 38, similar to the reservoir 25, may be connected to the lower end of the tube 39, corresponding to the tube 9, and mounted on the upper surface of at float 40, corresponding to the float 36, or suspended from the float 40, as indicated by the dot-dash lines. This arrangement is desirable in some instances in liquid level operated apparatus used in sewage tanks, particularly when the sludge is thick or viscous or is crusted over on top.

Since in all cases the operation is dependent upon the vertical head H—S acting on the diaphragm, neither the length of the tube 9 or its curvature has any effect on the operation. Though the transducer 8 heretofore described may be used in a number of ways in response to liquid levels in containers, its use with a sump pump has very distinct advantages. For example, a standard transducer 8 can be made with a length of tube 9 such that the same transducer 8 can be used in a sump in which different maximum and minimum liquid levels are desired. Furthermore, while the sensitivity of the system will depend upon the area of the diaphragm 11 and the rate of spring 21, as well as the characteristics of the snap switch 7, the volume of the reservoir 25 is not critical, provided that it expands and contracts with a minimum resistance force and that it is sufficiently large to freely accommodate all of the liquid displaced from the diaphragm 11 during its movements between its extreme positions.

Furthermore, the diaphragm 11 can be made of large or small diameter, depending upon the actual amount of force to be provided by the diaphragm for operating the switch 7 or other instrument to be operated by the transducer.

As mentioned, it is desirable to use the reservoir to prevent contamination of the liquid in the transducer 8 by contaminated water, liquids, solids or gases in the sump. However, it is to be noted that if such lower reservoir 25 is used, the transducer 8 can continue operating even though the reservoir 25 becomes ruptured.

Having thus described by invention, I claim:

1. A level detector comprising an elongated body having an upper end at an upper elevation and a lower end at a lower elevation with a continuous passage extending between the ends, an expansible and contractible chamber communicating with the passage and hermetically closing the upper end of the body, said chamber having a movable wall for expanding and contracting the chamber, an expansible and contractible reservoir communicating with the passage and hermetically closing the lower end of the body and positioned to be responsive to the level to be detected, a liquid completely filling the passage, the chamber and the reservoir, a resilient means constantly urging the wall in a direction to expand the chamber, and means responsive to the position of the wall for detecting movements of the wall in response to expansion and contraction of the chamber and reservoir which occur consequent upon changes in the level to be detected.

2. A liquid level responsive apparatus for responding to changes in the level of liquid in a receptacle, said apparatus comprising an elongated body having an upper and a lower end and a continuous passage extending between said ends, support means supporting the body with the upper end of the body at an elevation above the lower end and above the liquid in the receptacle, an expansible and contractible upper sealing means sealing the upper end of the passage and defining a volumetrically expansible and contractible chamber portion communicating with the passage, an expansible and contractible lower sealing means sealing the lower end of the passage and defining a volumetrically expansible and contractible reservoir portion communicating with the passage, a column of liquid completely filling the passage and in continuous contact with the upper and lower sealing means for causing expansion and contraction thereof upon movement of the column of liquid in the passage, resilient biasing means constantly urging the upper sealing means in a direction to expand the chamber portion, a device operatively connected to the upper sealing means and movable to different positions in response to expansion and contraction of the upper sealing means, and means supporting the lower end of the body so as to be responsive to the level of the liquid in the receptacle, whereby changes in the level of the liquid in the receptacle effect expansion and contraction of the upper and lower sealing means.

3. The combination as recited in claim 2 wherein said lower end of the body is carried by a float which floats on the surface of the liquid in the receptacle.

4. A liquid level responsive apparatus in accordance with claim 2 wherein said lower end of the body is submerged in the liquid in the receptacle.

5. An apparatus according to claim 2 wherein a lever is connected to the upper sealing means for movement in accordance with expansion and contraction of the upper sealing means, and wherein said resilient biasing means applies its biasing force to the lever.

6. An apparatus according to claim 2 wherein said device is a control device and is operative by expansion of the upper sealing means to effect a control operation, and is operative by contraction of the upper sealing means to discontinue said operation.

7. An apparatus according to claim 2 wherein said device is a self-restoring electric snap switch.

8. In combination with a receptacle adapted to contain liquid between predetermined upper and lower surface levels, a pump having its inlet below said lower level, an electric motor drivingly connected to the pump, a sealed force transducer comprising an elongated body having a passage extending endwise of the body therethrough, means supporting the body with one end of the body above the upper surface level of the liquid in the receptacle and above its other end, expansible and contractible sealing means sealing the upper end of the passage and defining a volumetrically expansible and contractible chamber portion communicating with the passage, a column of liquid completely filling the passage and chamber portion, a switch operatively connected to said sealing means for starting and stopping the motor in response to expansion and contraction of said sealing means, resilient means connected to the sealing means and urging the sealing means in a direction to expand the chamber portion, and expansible and contractible reservoir means communicating with the passage and hermetically closing the lower end of the body, said reservoir means being filled with the liquid of the passage and operatively associated with the liquid in the receptacle whereby changes in the level of liquid in the receptacle effect expansion and contraction of said reservoir means and said sealing means thereby to start the motor when the surface level of the liquid in the receptacle reaches one of said predetermined levels and to stop the motor when the surface level of the liquid reaches the other of said levels.

9. A liquid level responsive apparatus for responding to changes in the level of liquid in a receptacle, said apparatus comprising an elongated body having an upper and a lower end and a continuous passage extending between said ends, support means supporting the body with the upper end of the body at an elevation above the lower end and above the liquid in the receptacle, an expansible and contractible upper sealing means sealing the upper end of the passage and defining a volumetrically expansible and contractible chamber portion communicating with the passage, a column of liquid completely filling the passage and in continuous contact with the sealing means for causing expansion and contraction thereof upon movement of the column of liquid in the passage, resilient biasing means constantly urging the sealing means in a direction to expand the chamber portion, a device operatively connected to the sealing means and movable to different positions in response to expansion and contraction of the sealing means, and a float which floats on the surface of the liquid in the receptacle and supports the lower end of the body so as to be responsive to the level of the liquid in the receptacle, whereby changes in the level of the liquid in the receptacle effect expansion and contraction of the sealing means.

10. A liquid level responsive apparatus for responding to changes in the level of liquid in a receptacle, said apparatus comprising an elongated body having an upper and a lower end and a continuous passage extending between said ends, support means supporting the body with the upper end of the body at an elevation above the lower end and above the liquid in the receptacle, an expansible and contractible upper sealing means sealing the upper end of the body and defining a volumetrically expansible and contractible chamber portion communicating with the passage, a column of liquid completely filling the passage and in continuous contract with the upper sealing means for causing expansion and contraction thereof upon movement of the column of liquid in the passage, an expansible and contractible lower sealing means sealing the lower end of said elongated body and defining a volumetrically expansible and contractible reservoir portion communicating with the passage and filled with the liquid of the passage, said lower end of the body, when said reservoir portion is fully expanded, having a capacity adequate to receive and freely accommodate liquid from the passage in an amount equal to that displaced when the chamber portion defined by the upper sealing means is fully contracted, and said lower end of the body, when said lower reservoir portion is contracted, freely furnishing sufficient fluid to the passage for accommodating movement of the upper sealing means to a position in which the chamber portion is fully expanded, resilient biasing means constantly urging the upper sealing means in a direction to expand the chamber portion, a device operatively connected to the upper sealing means and movable to different positions in response to expansion and contraction of the upper sealing means, and means supporting the lower end of the body so as to be responsive to the level of the liquid in the receptacle, whereby changes in the level of the liquid in the receptacle effect expansion and contraction of the upper and lower sealing means.

11. A liquid level responsive arparatus for responding to changes in the level of liquid in a receptacle, said apparatus comprising an elongated body having an upper and a lower end and a continuous passage extending between said ends, support means supporting the body with the upper end of the body at an elevation above the lower end and above the liquid in the receptacle, an expansible and contractible upper sealing means sealing the upper end of the passage and defining a volumetrically expansible and contractible chamber portion communicating with the passage, a column of liquid completely filling the passage and in continuous contact with the sealing means for causing expansion and contraction thereof upon movement of the column of liquid in the passage, a lever connected to the sealing means for movement in accordance with expansion and contraction of the sealing means, resilient biasing means biasing said lever so as to constantly urge the sealing means in a direction to expand the chamber portion, a device operatively connected to the sealing means and movable to different positions in response to expansion and contraction of the sealing means, and means supporting the lower end of the body so as to be responsive to the level of the liquid in the receptacle, whereby changes in the level of the liquid in the receptacle effect expansion and contraction of the sealing means.

12. A liquid level responsive apparatus for responding to changes in the level of liquid in a receptacle, said apparatus comprising an elongated body having an upper and a lower end and a continuous passage extending between said ends, support means supporting the body with the upper end of the body at an elevation above the lower end and above the liquid in the receptacle, an expansible and contractible upper sealing means sealing the upper end of the passage and defining a volumetrically expansible and contractible chamber portion communicating with the passage, a column of liquid completely filling the passage and in continuous contact with the sealing means for causing expansion and contraction thereof upon movement of the column of liquid in the passage, resilient biasing means constantly urging the sealing means in a direction to expand the chamber portion, a self-restoring electric snap switch operatively connected to the sealing means and movable to different positions in response to expansion and contraction of the sealing means, and means supporting the lower end of the body so as to be responsive to the level of the liquid in the receptacle, whereby changes in the level of the liquid in the receptacle effect expansion and contraction of the sealing means.

References Cited by the Examiner

UNITED STATES PATENTS

| | | | |
|---|---|---|---|
| 1,173,160 | 5/1929 | Auckland | 73—302 |
| 2,242,589 | 5/1941 | Meyer | 73—299 |
| 2,488,506 | 11/1949 | Bernhardt | 103—25 |
| 2,514,632 | 7/1950 | Flubacker | 200—83.91 |
| 2,520,660 | 8/1950 | Sedwick | 200—83.91 |
| 2,787,220 | 4/1957 | Patterson et al. | 103—25 |
| 2,794,088 | 5/1957 | Ostby | 103—25 X |
| 2,910,003 | 10/1959 | Kaatz | 103—25 |
| 2,914,081 | 11/1959 | Bigham | 103—25 X |
| 2,922,854 | 1/1960 | Nielsen | 103—25 X |
| 2,956,581 | 10/1960 | Pearson | 137—394 X |
| 3,183,322 | 5/1965 | Singer | 200—83 |

DONLEY J. STOCKING, *Primary Examiner.*

SAMUEL LEVINE, MARK NEWMAN, *Examiners.*

W. L. FREEH, *Assistant Examiner.*